Patented Jan. 10, 1939

2,143,224

UNITED STATES PATENT OFFICE 2,143,224

HALOGEN EXTRACTION

George W. Hooker, Midland, Mich., assignor to The Dow Chemical Company, Midland, Mich., a corporation of Michigan Application May 13, 1936, Serial No. 79,405

6 Claims. (Cl. 23—217)

This invention relates to processes for extracting halogens having a higher atomic weight than chlorine, i. e. bromine and iodine, from solutions, brines and the like, particularly from naturally occurring solutions which contain but a minute amount of the desired halogen.

A well known method of extracting bromine or iodine from natural salines containing them is known as the "blowing-out" process. In its usual form it consists in oxidizing the acidified brine, by chlorinating, electrolyzing or otherwise, to liberate the free bromine or iodine therein, blowing out the liberated halogen with a voluminous current of air and scrubbing the halogen-laden air stream with a solution of an alkali to absorb the halogen by chemical combination therein.

There are certain limitations to the foregoing method which add to the cost of the extraction and reduce the yield of halogen. Particularly in the absorption step, in which the halogen in the air stream is recovered by scrubbing with an alkali solution, are these deficiencies of material concern. It is necessary to employ a relatively dilute alkali solution for the absorption, in practice having a concentration of not over 5 per cent of the alkali, and even then an excessively large contact surface and correspondingly large volume of scrubbing solution must be used in order to avoid large losses of halogen in the waste air. Furthermore, the alkali content of the solution can be reacted to not more than 60 to 70 per cent of the total, since at a higher degree of saturation an appreciable vapor pressure of free halogen exists, which free halogen tends to be removed from the solution by the air stream and thus become lost. Even under the best commercial practice a material proportion of the halogen in the air stream escapes absorption, so that the yield of halogen is considerably short of the theoretical, while the concentration of halogen in the absorbing solution does not normally exceed 2 to 5 per cent.

It is among the objects of the present invention to increase the recovery of bromine or iodine in a blowing-out process for producing the same, as well as to reduce the cost of absorption of the halogen from the air stream. Another object is to provide a more effective absorption agent than the alkali used in the prior art. Still another object is to simplify and reduce the size of apparatus used for the absorption of halogen from the air stream. The foregoing and other objects are accomplished by the invention which is hereinafter fully described and particularly pointed out in the claims.

Figure 1:
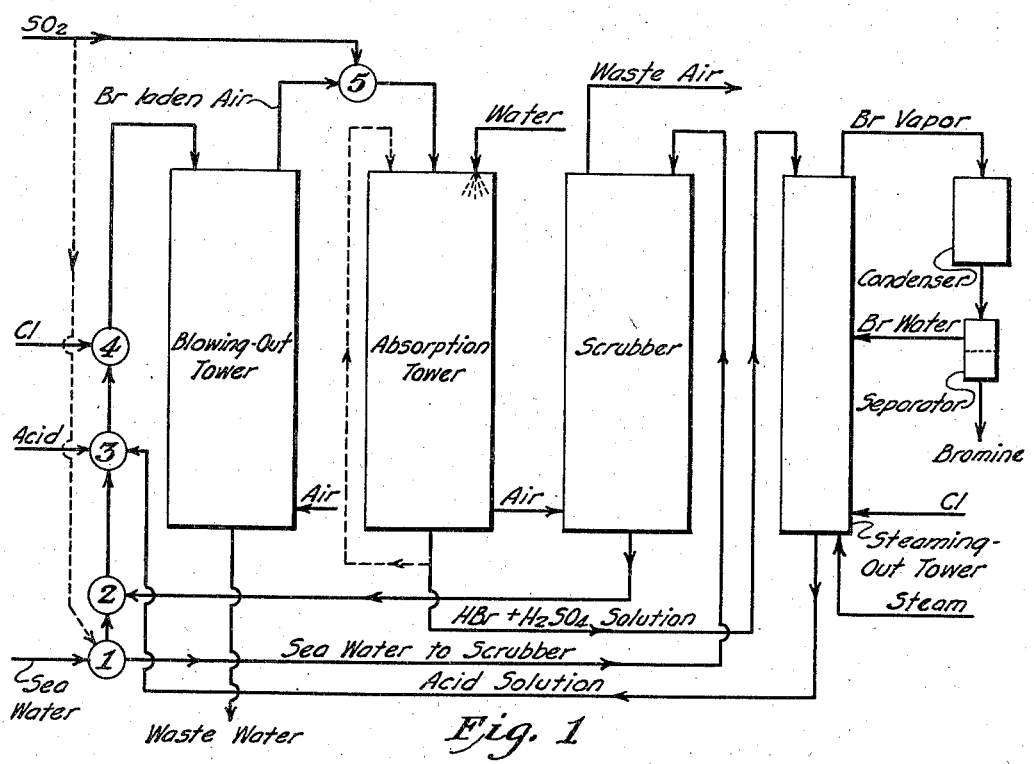
Figure 2:
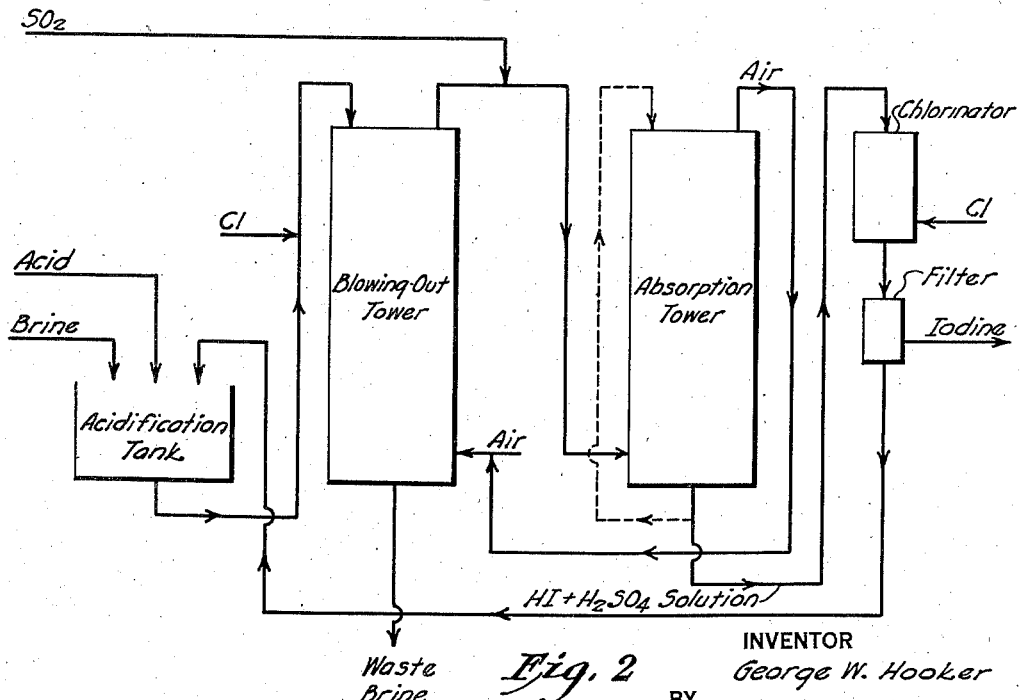

In the annexed drawing, Fig. 1 shows diagrammatically in the form of a flow sheet one embodiment of the invention as applied to the extraction of bromine from sea water. Fig. 2 shows similarly a process for obtaining iodine from an iodiferous brine.

I have found that the absorption by chemical means of bromine or iodine from the air-stream in a blowing-out process is greatly facilitated and the percentage recovery of halogen may be made practically quantitative in a very simple and effective manner by adding sulphur dioxide to the halogen-laden moist air stream in amount sufficient to combine with the free halogen therein, whereby the halogen is reduced to the corresponding hydro-halogen acid, in accordance with the equations;

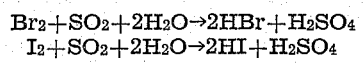

$$Br_2 + SO_2 + 2H_2O \rightarrow 2HBr + H_2SO_4$$
$$I_2 + SO_2 + 2H_2O \rightarrow 2HI + H_2SO_4$$

The so-formed mixture of hydrogen halide and sulphuric acid can be readily absorbed substantially completely by scrubbing the air stream with water or the acid solution which is produced by such absorption. By this means a solution can be obtained, without loss of effectiveness of the absorbing medium, having a combined halogen content much greater than that attainable when an alkaline scrubbing agent is used. In fact, I have found that the formation of hydrogen halide and sulphuric acid in the presence of water vapor in the air stream results in condensing the acids substantially completely as small droplets forming a mist or fog, due to the dissolution of the acids in water to produce a solution having so low a vapor pressure that it condenses spontaneously. The condensed droplets can be caught and removed from the air stream by scrubbing with an aqueous solution of the acids or mechanically by means of an entrainment separator, such as a packed absorber tower in which no scrubbing solution is employed. A combination of both methods of absorption may also be used.

A preferred embodiment of the invention is represented in Fig. 1 of the drawing, which shows a process for extracting bromine from sea water, the bromine content of which, in combined form, is in general on the order of about 60 parts per million. The sea water, after settling and clarifying, if necessary, is introduced at the lower left hand corner. At 1 the incoming sea water is divided, a minor proportion, e. g. 10 per cent, is conveyed to the top of the scrubber for a purpose to be explained presently, the underflow from scrubber being returned to 2 where it rejoins the main flow of sea water. The sea water is pumped to the top of a blowing-out tower, acid being added at 3 to acidify the water, and chlorine being added at 4 in amount sufficient to oxidize the combined bromine to free bromine. The acidification at 3 may be effected by use of a mineral acid such as hydrochloric or sulphuric acid. A portion of the acid requirement is furnished by acid solutions produced at a later stage in the process, as hereinafter described, so that only sufficient acid from an outside source is used to make up for the deficiency in by-product acid from the process.

Instead of acidifying at 3 with a strong mineral acid, I may employ a weaker acid such as sulphur dioxide (sulphurous acid). In such case it is desirable to add sulphur dioxide in such manner that the sulphite ion will be oxidized to sulphate prior to the addition of chlorine, to avoid increasing the chlorine demand of the process. A suitable modification of the foregoing procedure consists in adding sulphur dioxide to the sea water just entering the process at 1, as indicated by the dotted line. I have found that the dissolved oxygen in the incoming sea water is sufficient to oxidize the sulphite ion to sulphate, if a moderate time interval is allowed before the water is further acidified and chlorinated. Since sulphur dioxide is essential for use in a later step of the process, it is an operating advantage in this case to use it for the acidification also, instead of another acid.

The acidified and chlorinated sea water at the top of the blowing-out tower is distributed over a body of packing material and flows downwardly therein against an ascending voluminous current of air introduced at the base of the tower. The air current vaporizes or "blows out" the free bromine from the sea water, in the manner old in the art. The debrominated sea water runs to waste from the bottom of the tower, while the air stream containing the bromine and any excess of chlorine present, also being largely saturated with water vapor, passes from the top of the blowing-out tower to an absorption tower. In the latter it may be introduced either at the top, as shown, or at the bottom.

At a point 5 in the air line between the blowing-out tower and the absorption tower sulphur dioxide is mixed with the air stream in amount equivalent to, or in excess of, the free halogen present. In practice sulphur dioxide may be added as a 10 to 15 per cent gas mixture, such as is obtained by burning sulphur with air. If desired, an aqueous sulphurous acid solution can also be used, which is sprayed into the air stream. The sulphur dioxide reacts with the free halogen in the air stream, thereby forming a mixture of hydrogen halide and sulphuric acid which immediately condenses with the water vapor present to form a mist of fine liquid droplets of an aqueous solution of the mixed acids. The air stream holding in suspension the acid mist is brought into intimate contact with a body of packing material, such as Raschig rings or other ceramic packing material, coke, glass wool, or the equivalent, in the absorption tower, where the liquid droplets are deposited upon the surface of the packing and coalesce into a liquid body which runs off the packing material and flows out at the base of the tower. Alternatively, the air stream may be scrubbed with water or an acid liquor in the absorption tower, forming a solution of the mixed acids, which, if desired, may be recirculated over the tower to build up a sufficient acid concentration, as indicated by the dotted line. In the absorption step any hydrochloric acid, originating in excess chlorine added in the oxidizing step, is likewise absorbed for the most part, although being more volatile than hydrobromic acid, a portion of it may be carried out with the vent gases, whereas the hydrobromic acid under proper conditions is substantially absorbed.

The air stream stripped of substantially all of the hydrogen bromide and sulphuric acid passes from the absorption tower to a scrubber, wherein it is scrubbed with the portion of the original sea water which was diverted at 1. The sea water, which has a natural alkaline reaction, serves to neutralize and absorb any sulphur dioxide and hydrochloric acid in the air, as well as traces of hydrogen bromide or sulphuric acid carried over from the absorption tower. The scrubbed air stream is vented at the top of the scrubber, while the scrubbing brine, having a portion of its alkalinity neutralized, is returned from the base of the scrubber to the incoming sea water line at 2. This scrubbing step serves the purpose of recovering acid values in the air stream, along with any halogen which may have escaped absorption, and to utilize such acid in acidifying the sea water, while returning any recovered halogen to the process.

The solution of hydrobromic and sulphuric acids from the base of the absorption tower is pumped to the top of a steaming-out tower, which is packed in similar manner to the absorption tower and scrubber, and wherein the acid solution flows downwardly over the packing, while steam and chlorine are introduced near the bottom and in passing up through the packing become intimately mixed with the downflowing acid solution. The chlorine is added in about calculated amount to liberate free bromine from the hydrobromic acid in the solution, while the steam heats the solution to vaporize the bromine and distill it out. The vapors of bromine and water pass from the top of the tower to a condenser, and thence to a separator where the liquid bromine separates out from the condensed water. The bromine is drawn off from the separator, as the immediate product of the process, and may be further purified according to known methods, while the water layer, saturated with bromine and also containing some hydrobromic acid, is returned to the steaming-out tower.

The debrominated liquor, consisting of a solution of sulphuric and hydrochloric acids and also containing any unvaporized bromine, is drawn off from the base of the steaming-out tower and returned to the incoming sea water line at 3 to supply a portion of the acid required to acidify the sea water. The acid requirements for acidifying the sea water are thus seen to be provided from three sources in order to economize waste products from the process; (1) from the portion of the sea water employed in the scrubber, (2) from the acid liquor effluent from the steaming-out tower, and (3) the balance as sulphur dioxide or other mineral acid from an external source. In practice about two-thirds of the acid is obtained from the scrubber and steaming-out tower liquors and one-third from the outside source, although these proportions can vary considerably depending upon operating conditions, the alkalinity of the bromine-containing solution and the degree of acidification desired. Usually the sea water is acidified to a pH value of approximately 3, although a higher or lower degree of acidity may be used.

A small amount of heat of reaction is evolved by the chemical reaction of $SO_2$ and $Br_2$ in the air stream, and a considerably larger amount of latent heat is liberated by condensation of water in forming the solution of HBr and $H_2SO_4$, which tends to raise the temperature of the air, and hence the temperature of the solution in the absorption tower. To prevent a material temperature rise in the absorption tower a sufficient amount of water may be introduced by means of a water spray, or otherwise, which by evaporation will compensate for the latent heat liberated in the condensation of the acid solutions. Such water introduction is indicated in Fig. 1 at the top of the absorption tower.

The efficiency of absorption of hydrobromic acid from the air stream in any particular case is a function of the apparatus employed, depending upon the height and cross-section, as well as the type and surface area of the packing material, in proportion to the volume and velocity of air flow, as is well understood by those skilled in the art. On a comparative basis, however, I have been able, by proceeding as above described, to attain a recovery of from 98 to 100 per cent of the bromine in the air, in dilution of 1 part of bromine to from 12,000 to 200,000 parts of air, employing a certain apparatus of suitable size and contact surface, whereas in the same apparatus, using a 5 per cent sodium carbonate solution to absorb free bromine from the air stream in accordance with the known method, the average bromine recovery was only 80 per cent. The foregoing result was obtained in a single absorber tower in which a solution of hydrobromic and sulphuric acids was circulated over the packing material. When employing the tower simply as an entrainment separator without circulation of absorbing solution, a recovery of 90 to 95 per cent of the bromine was had, while using two similar towers in series the recovery was 95 to 98 per cent.

In commercial practice of the alkali absorption method it has not been found economically possible to recover as much as 95 to 100 per cent of the bromine in the air stream, even when using a number of absorption towers in series. The present invention, therefore, not only makes possible a higher recovery of bromine, but also enables such high recovery to be attained in much smaller apparatus, thus saving materially in capital cost and maintenance and operating charges of plant.

Another advantage of the method of the invention is a reduction in cost of materials consumed in the process. In the alkali absorption process, as already shown, it is practical to react not more than 60 to 70 per cent of the alkali, otherwise vaporization losses of bromine are increased. Since it is necessary to use very dilute alkali solutions, 5 per cent or less, the percentage of combined bromine in the finished absorber liquor is low, not more than 4 to 5 per cent, and usually lower. To separate the bromine from the alkali solution the latter must be acidified, enough acid being required to neutralize the excess of alkali. In the method of the invention no alkali is required, and the acid formerly required to neutralize the same is saved as well. It is also practical in the present process to obtain an acid absorber liquor containing as high as from 10 to 20 per cent of combined bromine, depending upon the relative volumes of liquor and air, and the water vapor content of the air.

In the operation of the process a moderate excess of sulphur dioxide is used to treat the bromine-laden air, on the order of 5 to 10 per cent, although a larger excess may be used if desired. In any case such excess of sulphur dioxide is not lost in the waste gases but is recovered in the scrubbing step and utilized in acidifying the sea water.

Naturally similar procedure to that above described may be used to extract bromine from other salines, such as natural brines or bitterns, in which the bromine content may be higher than that of sea water. The solution of hydrobromic and sulphuric acids obtained in the absorption step may be worked up by other procedure than that described to recover the bromine therefrom either in elemental or combined form, according to known methods.

The invention is equally applicable to the extraction of iodine from iodiferous salines, such as certain oil field brines which have been utilized as a source of iodine in commercial processes already known. The procedure just described for extracting bromine from sea water may be adapted to the recovery of iodine with little or no change, although various modifications of the method may be made to accord with local conditions, the character of the brine, the specific properties of iodine, etc. One such modified procedure for obtaining iodine from a natural brine is shown diagrammatically in Fig. 2. Such brines in practice have an iodine content of about 50 to 70 parts per million, and are distinctly alkaline. The raw brine, after purification, is introduced into an acidification tank, where acid is added sufficient to produce in the brine a degree of acidity preferably corresponding to a pH value between 2 and 3. The acid employed may be any suitable mineral acid, a portion of the requirement being obtained as by-product of a later stage of the process. The acidified brine is then pumped to the top of a blowing-out tower, chlorine being mixed therewith in amount sufficient to liberate the iodine. The iodine is vaporized and blown out by a current of air introduced at the base of the tower, the iodine-laden air passing out from the top of the tower. Sulphur dioxide is admixed with the iodine-laden air in amount sufficient to react with the iodine therein, the air stream then being conducted to an absorption tower wherein it is absorbed in a water solution similarly as shown in Fig. 1. The absorbing solution may be recirculated, as indicated by the dotted line. The deiodinated air stream from the absorption tower may be vented to waste, or may be recirculated to the blowing-out tower, as shown, in the latter case any iodine and acid values contained therein being returned to the system. The solution of hydriodic and sulphuric acids from the absorption tower is conducted to a chlorinator, where chlorine is added in amount sufficient to liberate the iodine, which is precipitated and separates as solid in the solution. The precipitated iodine is filtered from the acid solution, such iodine product then being further purified according to known methods, while the acid liquor is returned to the acidification tank to supply a portion of the acid required for acidifying the brine. By such procedure it is possible to recover substantially quantitatively the iodine in the air stream from the blowing-out tower.

The various steps and operations hereinbefore described and illustrated, or the equivalent thereof, are adapted for the recovery of either bromine or iodine from brines and solutions containing the same, either singly or together. In any case the principal feature distinguishing the invention from other methods heretofore disclosed consists in the addition of sulphur dioxide to the halogen-laden air stream obtained in the blowing-out step, thereby making possible a higher recovery of the halogen by simpler means than hitherto has been attainable in commercial processes for extracting bromine or iodine from natural waters and the like. Instead of air another gas inert to free halogen, such as nitrogen, carbon dioxide, combustion gases, etc., may be used in the blowing-out step, although air will be more economical in most cases.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. A process for producing a halogen having a higher atomic weight than chlorine which comprises acidifying a saline solution containing the desired halogen in combined form, oxidizing to liberate the free halogen, blowing out such liberated halogen by means of a voluminous current of air, adding sulphur dioxide to the halogen-laden air stream in amount sufficient to react with the free halogen therein, absorbing the resulting mixture of hydrogen halide and sulphuric acid in an aqueous solution of the said acids, and recovering the free halogen from the latter solution.

2. A process according to claim 1, in which the dehalogenated air stream from the absorbing step is further scrubbed with a portion of the original saline solution, and the scrubber liquor is then added to the solution entering the process.

3. A process according to claim 1, in which the solution of hydrogen halide and sulphuric acid obtained in the absorbing step is chlorinated to liberate the free halogen, such halogen is separated from the acid liquor and the latter employed to acidify the saline solution entering the process.

4. In a process for extracting a halogen having a higher atomic weight than chlorine from a solution or brine containing the halogen in combined form, the steps which consist in liberating the elemental halogen in the solution by oxidation, removing the liberated halogen from the solution by blowing out with a current of inert gas such as air, adding sulphur dioxide to the halogen-laden moist gas stream in amount sufficient to react with the free halogen therein and separating the resulting mixture of hydrogen halide and sulphuric acid from the gas stream by intimately contacting the latter with an aqueous solution of the said acids.

5. In a process for extracting bromine from a solution or brine containing the same in combined form, the steps which consist in liberating elemental bromine in the solution by oxidation, removing the liberated bromine from the solution by blowing out with a current of air, adding sulphur dioxide to the bromine-laden moist air stream in amount sufficient to react with the free bromine therein, and separating the resulting mixture of hydrobromic acid and sulphuric acid from the air stream by intimately contacting the latter with an aqueous solution of the said acids.

6. In a process for extracting iodine from a solution or brine containing the same in combined form, the steps which consist in liberating elemental iodine in the solution by oxidation, removing the liberated iodine from the solution by blowing out with a current of air, adding sulphur dioxide to the iodine-laden moist air stream in amount sufficient to react with the free iodine therein and separating the resulting mixture of hydriodic acid and sulphuric acid from the air stream by intimately contacting the latter with an aqueous solution of the said acids.

GEORGE W. HOOKER.